United States Patent
Barnett et al.

[11] 3,774,936
[45] Nov. 27, 1973

[54] OCCUPANT RESTRAINT SYSTEM
[75] Inventors: Ronald R. Barnett, Rochester; George Drach, Jr., Warren, both of Mich.
[73] Assignee: General Motors Corporation, Detroit, Mich.
[22] Filed: Oct. 16, 1970
[21] Appl. No.: 81,249

[52] U.S. Cl.................. 280/150 AB, 296/84 K
[51] Int. Cl............................................. B60r 21/10
[58] Field of Search.................. 280/150 AB, 150 B, 280/150 SB; 296/84 K; 244/121, 122

[56] References Cited
UNITED STATES PATENTS

| | | | |
|---|---|---|---|
| 3,414,292 | 12/1968 | Oldberg et al............... | 280/150 AB |
| 2,806,737 | 9/1957 | Maxwell........................ | 280/150 B |
| 2,025,822 | 12/1935 | Pryor............................. | 280/150 B |
| 1,936,251 | 11/1933 | McCullough.................. | 296/84 K |
| 2,942,913 | 6/1960 | Felts............................. | 280/150 B X |
| 3,198,543 | 8/1965 | Presunka...................... | 280/150 B |

*Primary Examiner*—Kenneth H. Betts
*Attorney*—W. E. Finken and Herbert Furman

[57] ABSTRACT

A vehicle body includes front and rear seats and a roof structure overlying the seats. Generally parallel disposed diffuser and pressure vessel tubes are mounted on the roof structure above the front seat and span the body transversely thereof. One end of each tube is sealed. A cross-over passage interconnects the other ends of the tubes. The other end of the pressure vessel tube opening to the passage is sealed by a glass diaphragm. Detonators are located adjacent the glass diaphragm. The detonators are electrically connected with a sensor which senses acceleration pulses of predetermined amplitude and time applied to the vehicle body. A sectioned inflatable cushion is of a width to generally span the body transversely thereof and has one transverse edge portion secured to the diffuser tube. The slots in the tube open to the interior of the cushion. The cushion is of a length so that the other transverse edge portion thereof can be located in a position to engage the pelvic area of any occupant seated on the rear seat when the cushion is inflated from the diffuser tube. A pulley is mounted on the roof structure adjacent each end of the diffuser tube. A continuous loop cable extends over each pulley and is secured at one point to a respective side edge portion of the cushion adjacent the other transverse edge portion. Each cable also passes through a one-way cleat on the body to each side of the rear seat. When the cushion is in a deflated folded or rolled-up condition, the cables are positioned above the headlining. Upon a pulse of the required amplitude and time being applied to the vehicle, the detonators break the glass diaphragm to inflate the cushion from the diffuser tube. As the cushion inflates, it unfolds or unrolls downwardly and pulls the cables through the headlining, around the pulleys, and through the cleats to locate the cushion in a position wherein it provides a barrier for the torso of a rear seat occupant and the other transverse edge portion thereof will engage the pelvic area of any such occupant and exert a rearward and downward restraining force thereon.

13 Claims, 8 Drawing Figures

INVENTORS
Ronald R. Barrett &
BY George Drach, Jr.
Herbert Furman
ATTORNEY

OCCUPANT RESTRAINT SYSTEM

This invention relates to occupant restraint systems and more particularly to an inflatable occupant restraint cushion mounted on the roof structure of a vehicle body and projectable downwardly from its mounting into a predetermined position to both provide a barrier for any occupant seated on a seat of the body and to engage the pelvic area of any such occupant and exert a restraining force thereon.

Conventionally, inflatable occupant restraint cushions for a vehicle body are mounted at various locations thereon, such as the instrument panel, the front seat back and the roof structure and are inflated, when an impact of predetermined magnitude is applied to the body, for engagement by various seated occupants.

The occupant restraint system of this invention includes a roof-mounted inflatable cushion. It differs from known systems by positively locating the inflated cushion in a predetermined position with respect to a seated occupant. The cushion is located to provide both a barrier for a seated occupant and to also apply a rearward and downward restraining force on the pelvic area of any such occupant.

In the preferred embodiment of the invention, an inflatable sectioned cushion is mounted at the upper edge portion thereof on the roof structure of a vehicle body. The cushion is generally located intermediately of the body above the front seat in a folded or rolled condition, and is of a size to span the body transversely thereof. Upon inflation, the cushion is projected downwardly of the body. Endless loop cables are normally stored above the headlining of the vehicle at each side of the cushion. The cables are trained over pulleys located to each side of the mounting of the cushion, through cleats mounted on the body to each side of the rear seat, and are anchored at one point to the sides of the cushion adjacent the lower or free edge portion thereof. As the cushion moves downwardly, it pulls the cables through the headlining, over the pulleys and through the cleats. A predetermined portion of the cables results between the anchor points on the cushion and the cleats such that the free edge portion of the cushion is located in a position to engage the pelvic area of a seated occupant and to apply a rearward and downward restraining force thereon. Additionally, the cushion is located in a position to provide a barrier between the torso of any such occupant and the front seat.

An object of this invention is to provide an improved occupant restraint system for a vehicle body which includes an inflatable cushion located in a predetermined position upon inflation so as to apply a rearward and downward restraining force on the pelvic area of an occupant of a vehicle seat. Another object of this invention is to provide such a cushion which is mounted on the roof structure of a vehicle body intermediately thereof and which provides a barrier for any occupants of the rear seat as well as applying a restraining force on the pelvic area of such occupants. A further object of this invention is to provide an occupant restraint system which includes an inflatable cushion mounted on the roof structure of a vehicle body and a control arrangement which positively locates the cushion upon inflation in a predetermined position transversely of the body so that the cushion both provides an occupant barrier and can engage the pelvic area of a seated occupant to apply a rearward and downward restraining force thereon.

These and other objects of this invention will be readily apparent from the following specification and drawings wherein.

Figure 1:
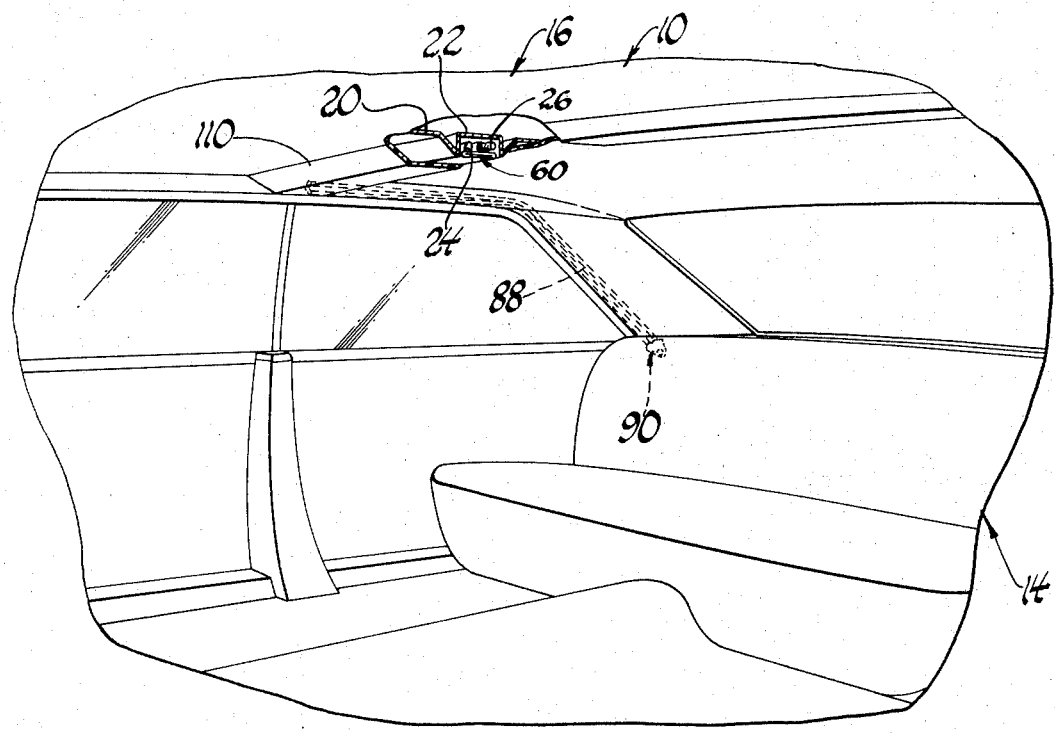
FIG. 1 is a partially broken away partial perspective view of a portion of a vehicle body embodying an occupant restraint system according to this invention, with the system being shown in unactuated position with the cushion deflated.
Figure 5:
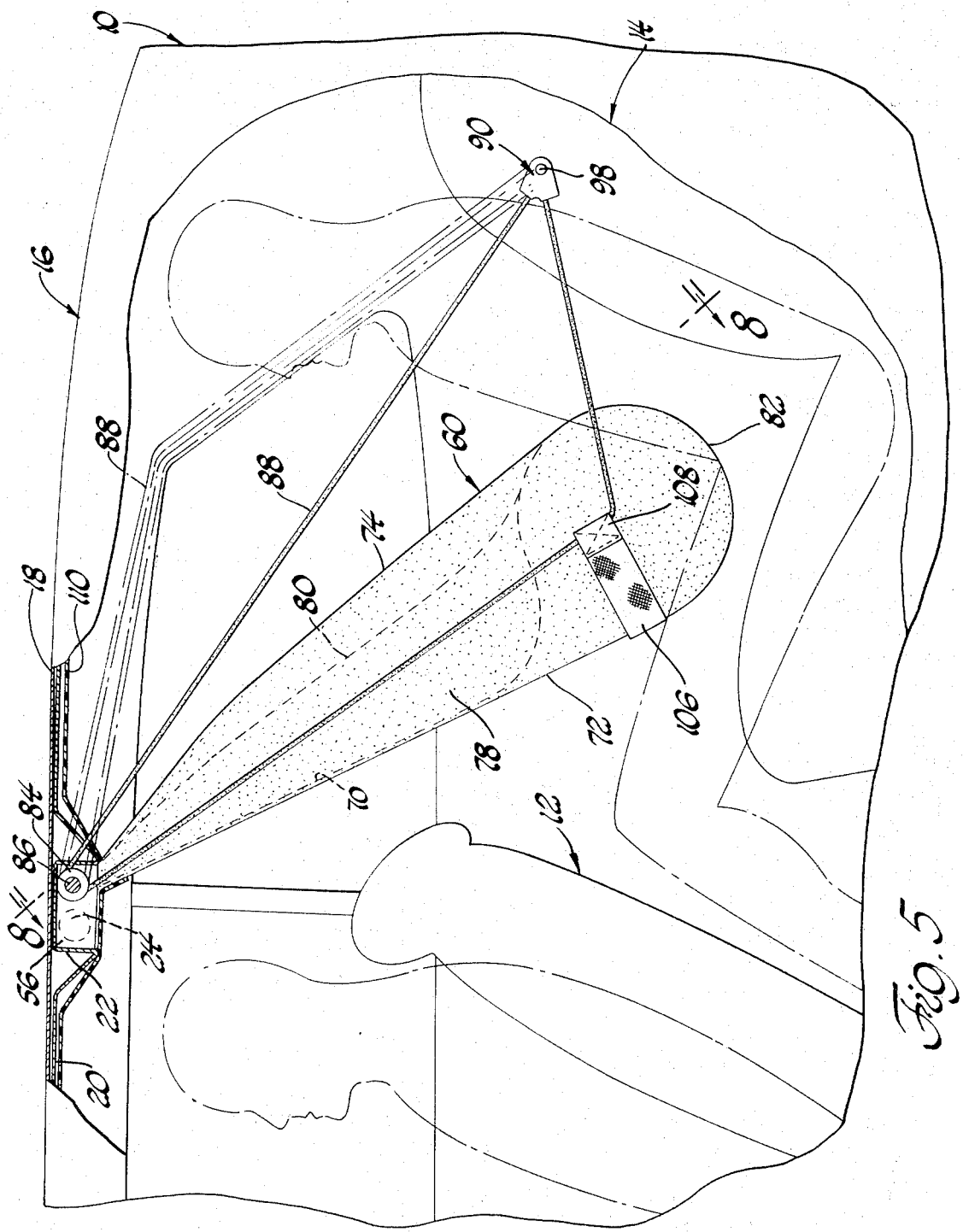
FIG. 5 is a partially broken away partial side elevational view of a vehicle body showing the occupant restraint in inflated operative position.

Referring now particularly to FIGS. 1 and 5 of the drawings, a vehicle body designated generally 10 includes a conventional front seat 12 and a conventional rear seat 14. The roof structure 16 of the body overlies the front and rear seats. The details of this roof structure form no part of this invention and reference may be had to Ser. No. 63,094 Foster et al, filed Aug. 12, 1970, and assigned to the assignee of this invention, for a full disclosure of such details. Generally the roof structure 16 includes a roof outer panel 18 and a roof inner panel 20 which are secured together to provide the roof structure. The inner panel 20 includes an outwardly offset inwardly opening housing 22 located generally above the front seat 12. The housing 22 spans the body transversely thereof and is of generally rectangular cross section. The flanges joining the housing to the roof structure are angled to provide skid plates.

Figure 3:
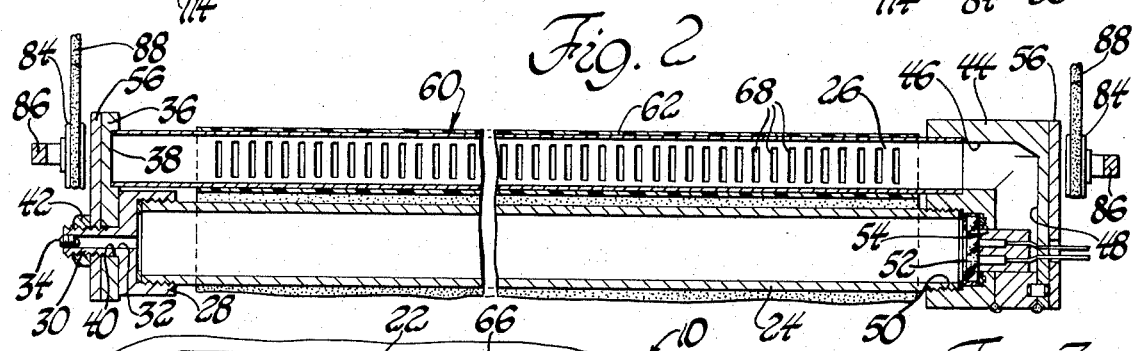
FIG. 3 is a sectional view taken generally along the plane indicated by line 3—3 of FIG. 2.
Figure 4:
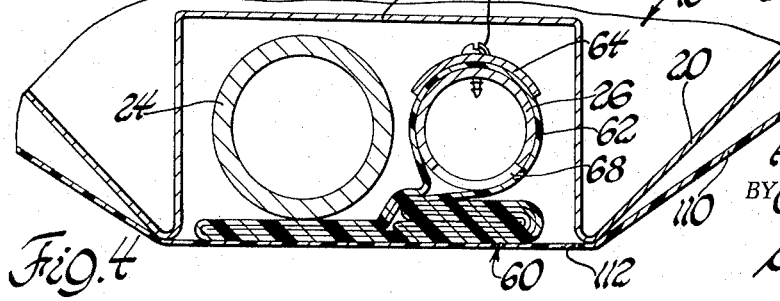
FIG. 4 is an enlarged sectional view taken generally along the plane indicated by line 4—4 of FIG. 2.

An elongated tubular pressure vessel 24 and an elongated tubular diffuser 26 are located within the housing 22 in generally parallel relationship, with the pressure vessel being located forwardly of the diffuser tube with respect to the vehicle, FIGS. 4 and 5. As shown in FIG. 3, a cap 28 is threaded on one end of the pressure vessel 24, with a seal being provided between the cap and the end of the vessel. The cap 28 includes a threaded extension 30 which is provided with an axial bore 32. The outer opening of the bore 32 is conventionally sealed by a plug 34. Bore 32 provides for filling of the pressure vessel with a conventional compressed fluid, such as air or nitrogen. In the specific embodiment shown, the pressure vessel 24 is filled with air at a pressure of approximately 3,500 psi. An end plate 36 includes a bore 38 receiving one end of the diffuser 26 and an aperture 40 receiving the extension 30 of the cap 28. A nut 42 threaded on the extension 30 secures the end plate 36 to the cap 28 as will be further described. The diffuser is welded to the plate 36 around bore 38.

An end cap 44 as shown in FIG. 3 includes a shouldered bore 46 receiving the other end of the diffuser, with the diffuser being welded to the cap around the bore. Bore 46 opens to a crossover bore 48 which in turn opens to a partially threaded bore 50. The other end of the pressure vessel 24 is threaded into the bore 50 with a seal being provided between the end of the vessel and a radial wall of the bore as shown. A glass diaphragm assembly 52 seals the other end of the pressure vessel to maintain the compressed fluid within the pressure vessel. A conventional detonator assembly 54, including a pair of conventional detonators mounted within a plastic housing, is located immediately adjacent the glass diaphragm assembly 52. The detonators of the assembly 54 are electrically connected with a conventional sensor mounted elsewhere on the body in a position to receive acceleration pulses applied to the body. When an acceleration pulse exceeding a predetermined amplitude and time is applied to the body, such sensor electrically connects the detonators with the source of power in a conventional manner so that the detonators break or rupture the diaphragm of assembly 52 and release the contents of the pressure vessel for flow through the bores 50, 48, and 46 and into the diffuser 26.

A pair of like angular brackets 56, FIG. 3, each have an outboard leg thereof bolted at 58 to the side rail portions of the inner panel 20. The inboard leg of the right-hand bracket 56 is welded to the end cap 44, and the inboard leg of the left-hand bracket 56 is bolted to the end plate 36 by the nut 42 to thereby mount the assembled diffuser and pressure vessel on the roof structure of the vehicle within the housing 22. The bolting of bracket 56 to plate 36 assembles the plate to the cap 28.

Figure 8:
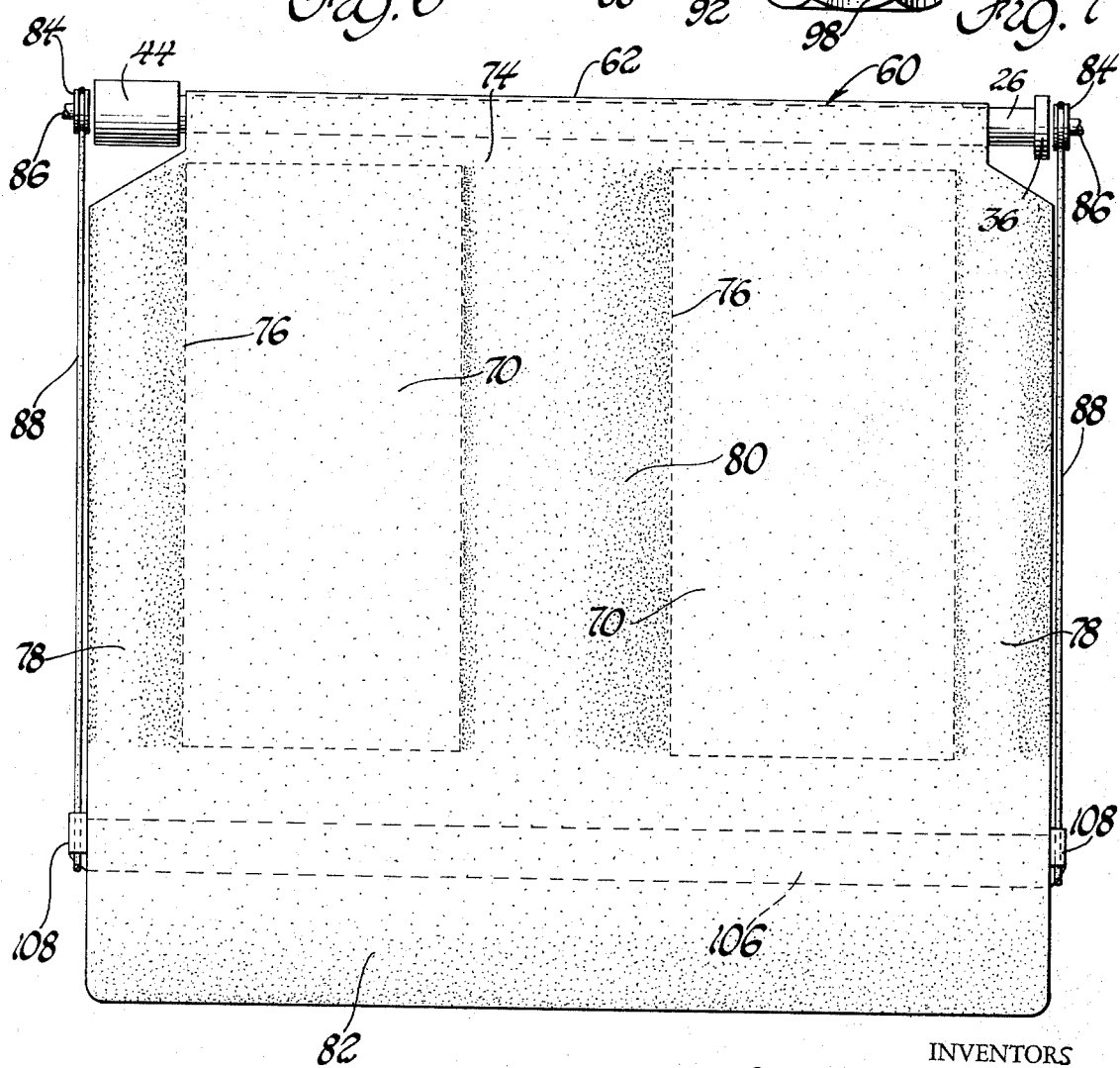
FIG. 8 is a partial view taken generally along the plane indicated by line 8—8 of FIG. 5 and showing the cushion inflated.

An inflatable cushion 60, FIGS. 5 and 8, is of generally rectangular shape and of a width to span the body transversely thereof. As shown in FIGS. 4 and 8, the upper edge portion 62 of the cushion extends around the diffuser 26 and is secured thereto in a conventional manner, such as by an elongated arcuately shaped bracket 64 and sheet metal screws 66. The diffuser slots 68, FIG. 3, thus open to the interior of the cushion for inflation thereof from the diffuser 26.

As shown in FIG. 8, the cushion 60 includes two inset panels 70, each of which is formed by stitching together the forward and rearward walls 72 and 74, respectively, FIG. 5, of the cushion along the stitch lines indicated at 76 in FIG. 8. The inset panels 70 are not inflated when the cushion is inflated as can be seen in FIGS. 5 and 8. Generally these panels are located opposite to and forwardly of the outboard seating positions of the rear seat 14. The panels 70 further divide the cushion 60 into generally vertically extending columnar-type side edge portions 78 of generally cylindrical cross section, a generally vertically extending columnar-type central portion 80 of generally cylindrical cross section and located generally opposite to and forwardly of the center seating position of the rear seat 14, and a generally horizontally extending lower edge portion 82 of generally cylindrical cross section.

Figure 2:
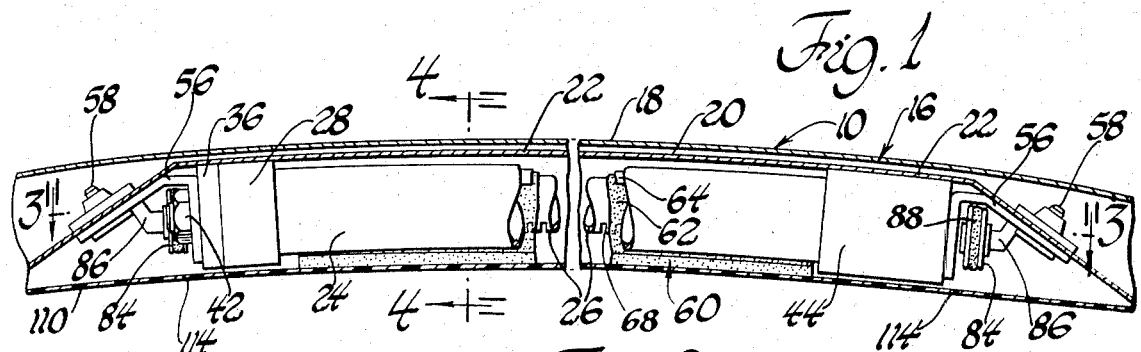
FIG. 2 is an enlarged broken away view of a portion of FIG. 1.
Figure 6:
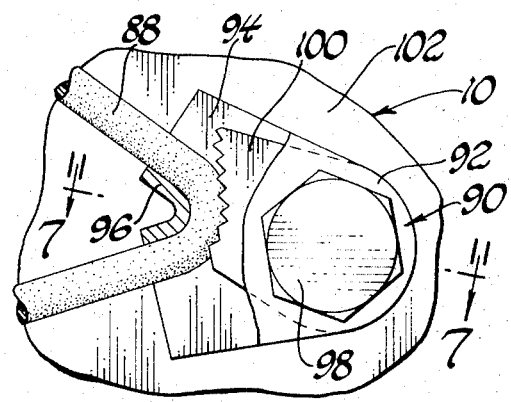
FIG. 6 is an enlarged view of a portion of FIG. 5.
Figure 7:
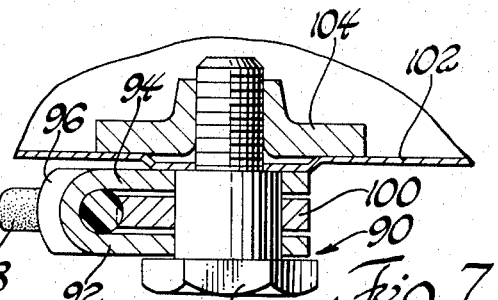
FIG. 7 is a sectional view taken generally along the plane indicated by line 7—7 of FIG. 6.

As shown in FIG. 2, a pair of like pulleys 84 are freely rotatably mounted on offset axles or shafts 86 which are secured to the outboard legs of the brackets 56. The pulleys are located adjacent respective sides of the cushion 60 and adjacent the end plate 36 and cap 44. The pulleys are axially aligned and, in the embodiment shown, are also aligned with the axis of the diffuser 26, although this is not necessary. An endless or loop cable 88 is received over a respective pulley 84. Each cable 88 also extends through a one-way pulley or cleat 90, mounted on the body to each side of the rear seat as shown in FIG. 5. The details of the cleats 90 are shown in FIGS. 6 and 7. Generally these cleats are of U-shaped cross section and include integral inboard and outboard legs 92 and 94, respectively, of generally V-shape and joined by a generally like-shaped web 96 which provides a guide for the cable 88. A shouldered bolt 98 extends through aligned apertures in legs 92 and 94 and also in a toothed plate or dog 100 located intermediate legs 92 and 94. The threaded portion of each bolt extends through an opening in a respective quarter inner panel 102 of the body and is threaded into a weld nut 103, FIG. 7, mounted on the interior of such panel. It can be seen from FIG. 6 that the cables 88 can freely pass through their respective cleats 90 when moving counterclockwise but are jammed between the webs 96 and the teeth of the dogs 100 if they try to move through their respective cleats in a clockwise direction.

As shown in FIGS. 5 and 8, a length of conventional webbing 106, such as seat belt webbing, is suitably secured to the forward wall 72 of the cushion 60 and extends transversely of such wall adjacent the lower edge portion 82 of the cushion. The free terminal ends 108 of the webbing 106 are folded back upon themselves and over a respective cable 88. The ends and cables are then stitched to the webbing and cushion to anchor a cable 88 to a respective side of the cushion.

When the cushion 60 is in a deflated condition, the cables 88 are located as shown in dot-dash lines in FIGS. 1 and 5 outwardly of the headlining 110 of the body. The cables extend generally longitudinally of the body adjacent the side roof rails and quarter panels thereof. The headlining 110 is conventional and the manner in which it is mounted on the roof structure is shown in the aforenoted Foster et al application. Generally, the headlining is mounted on the inner panel 20 by the use of clips and listing wires, but the listing wires do not extend completely across the body as is the conventional practice.

As shown in FIGS 1, 2, and 4, the cushion 60 is stored in a folded condition, although it should be noted that the cushion can likewise be stored in a rolled-up condition, with the roll being located on the rearward side of the cushion with respect to the body. The headlining 110 covers the opening of the housing 22 when the cushion is stored. Thus it can be seen that when the occupant restraint is in an unactuated position, it is completely stored within the roof structure of the body and it is completely out of sight. The headlining 110 is provided with tear lines for the cushion 60 and also for each of the cables 88. The tear line 112 for the cushion 60 is indicated in FIG. 4, and the tear lines 114 for the cables 88 are indicated at 114 in FIG. 2. Tear lines 114 extend longitudinally of the body and intersect the ends of line 112.

When the diffuser 26 receives the compressed fluid from the pressure vessel 24 as previously described, it will inflate the cushion 60 through the slots 68. As the cushion inflates, it will be projected or move downwardly from the roof structure 16 of the body. Since each cable 88 is anchored or secured at only one point, 108, to a side edge portion of the cushion 60, the cables 88 must move counterclockwise of the pulleys 84 as viewed in FIG. 5. Likewise the cables move in this same direction as viewed in FIG. 5 through their respective cleats 90. This is permitted by the dogs 100.

It must be remembered that each of the cables 88 is endless or of a predetermined loop size. Thus as the anchored points of the cables move downwardly, each of the cables will likewise move or swing the cushion 60 rearwardly of the body about the upper edge portion 62 so that the cushion is finally located in its fully inflated condition as indicated in FIG. 5. Here it will be noted that the lower edge portion 82 of the cushion is in a position to engage the pelvic area of any occupant on the rear seat 14 of the body and to also apply a rearward and downward restraining force on this area of his body. Such an occupant is schematically indicated in FIG. 5. The direction of force will tend to retain such an occupant in seated attitude and, of course, the force is applied to a strong structural part of the human skeleton.

Likewise the cushion 60, when fully inflated, provides a barrier limiting movement of the torso of such rear seat occupant forwardly of the body. When the torso of such occupant moves forwardly of the body about his hip hinge points, it will engage either an inset panel 70 of the cushion or the central portion 80 to restrain any further movement. It can be seen from FIGS. 5 and 6 that the dogs 100 do not permit any movement of the cables 88 in a clockwise direction through the cleats 90 so that the cushion 60 cannot move forwardly about its upper edge portion 62 when engaged by a seated occupant.

From the foregoing description, it can be seen that the cushion 60 is positively located when inflated, so as to provide both a barrier limiting torso movement of the seated occupant and the likewise apply a rearward and downward restraining force on the pelvic area of such occupant.

While the cushion 60 is an inflated cushion, it contains no relief provisions for escape of the inflating fluid when the cushion is engaged by the seated occupant. However, the cushion is made of woven cloth and accordingly does absorb impact energy from the seated occupant. It may be desirable in certain instances to provide the cushion 60 with conventional relief ports so as to permit escape of the inflating fluid when the cushion is subjected to impact by an occupant.

Thus, this invention provides an improved occupant restraint system. We claim:

1. In a vehicle body including a seat for supporting an occupant in seated attitude, a roof structure overlying the seat, and a source of pressure fluid, the combination comprising, an elongated inflatable member, means securing the member to the roof structure for projection therefrom upon inflation, means for selectively communicating the member with the pressure fluid source, and means operated by inflation and projection of the member downwardly and rearwardly from the roof structure to locate the member in a position to engage the pelvic area of a seated occupant and exert a rearward and downward restraining force thereon with respect to the body.

2. In a vehicle body including a seat for supporting an occupant in seated attitude, a roof structure overlying the seat, and a source of pressure fluid, the combination comprising, an elongated inflatable member, means securing the member adjacent one edge portion thereof to the roof structure for projection therefrom upon inflation, means for selectively communicating the member with the pressure fluid source, and means operated by inflation and projection of the member downwardly and rearwardly from the roof structure to locate the member in a position wherein an opposite edge portion thereof is engageable with the pelvic area of a seated occupant to exert a rearward and downward restraining force thereon with respect to the body.

3. In a vehicle body including a seat for supporting an occupant in seated attitude, a roof structure overlying the seat, and a source of pressure fluid, the combination comprising, an elongated inflatable member of a width to generally span the interior of the body transversely thereof, means securing a transverse edge portion of the member to the roof structure for projection of the member upon inflation, means for selectively communicating the member with the pressure fluid source, and means operative upon inflation and projection of the member from the roof structure to locate an opposite transverse edge portion of the member in a position to engage the pelvic area of any occupant seated on the seat and exert a rearward and downward restraining force thereon with respect to the body.

4. In a vehicle body including front and rear seats for supporting occupants in seated attitude, a roof structure overlying the seats, and a source of pressure fluid, the combination comprising, an elongated inflatable member, means securing the member to the roof structure intermediate the front and rear seats for projection therefrom upon inflation, means for selectively communicating the member with the pressure fluid source, and means operated by inflation and projection of the member downwardly and rearwardly from the roof structure to locate the member in a position to provide a barrier intermediate the front and rear seats and in engagement with the pelvic area of any occupant of the rear seat to exert a rearward and downward restraining force thereon with respect to the body.

5. In a vehicle body including a seat for supporting an occupant in seated attitude, a roof structure overlying the seat, and a source of pressure fluid, the combination comprising, diffusing means secured to the roof structure and spanning the interior of the body transversely thereof, an elongated inflatable member spanning the body transversely thereof, means securing an edge portion of the member to the diffusing means for projection therefrom upon inflation of the member by the diffusing means, means for selectively communicating the diffusing means with the pressure fluid source, and means operated by inflation and projection of the member downwardly and rearwardly from the diffusing means to locate the member in a position to engage the pelvic area of a seated occupant and exert a rearward and downward restraining force thereon with respect to the body.

6. In a vehicle body including a seat for supporting an occupant in seated attitude, a roof structure overlying the seat, and a source of pressure fluid, the combination comprising, an inflatable member of generally rectangular shape and of a width generally spanning the roof structure transversely of the body, the member being normally located in a folded condition adjacent the roof structure, means securing the member to the roof structure for projection therefrom upon inflation and unfolding of the member, means for selectively communicating the member with the pressure fluid source, endless cable means located adjacent each side edge portion of the inflatable member, means fixedly securing each cable means at one point to a respective side edge portion of the member, means movably securing each cable means at a plurality of other points to the body for movement in one direction relative thereto, inflation and projection of the member downwardly and rearwardly from the roof structure moving the cable means in the one direction relative to the movable securing means to locate the member in a position to engage the pelvic area of a seated occupant and exert a rearward and downward restraining force thereon with respect to the body.

7. The combination recited in claim 6 wherein the movable securing means includes at least one freely rotatable rotatable pulley and one one-way rotatable pulley mounted on the body to each side edge portion of the inflatable member.

8. In a vehicle body including a seat for supporting an occupant in seated attitude, a roof structure overlying the seat, and a source of pressure fluid, the combination comprising, an inflatable member of generally rectangular shape and of a width generally spanning the roof structure transversely of the body, the member being normally located in a folded condition adjacent the roof structure, means securing the upper edge portion of the member to the roof structure for projection therefrom with respect to the seat upon inflation and unfolding of the member, means for selectively communicating the member with the pressure fluid source, and means interconnecting the side edge portions of the inflatable member and the body and operated by inflation and projection of the member downwardly and rearwardly from the roof structure to locate the member forwardly and upwardly with respect to the seat to provide a barrier against forward movement of the occupant, the lower edge portion of the member being located in a position to engage the pelvic area of the occupant and exert a rearward and downward restraining force thereon with respect to the body.

9. The combination recited in claim 8 wherein the body includes flexible headlining covering the roof structure, the inflatable member being located upwardly of the headlining in folded condition, the headlining including predetermined tear lines for permitting penetration thereof by the inflatable member upon inflation and projection of the inflatable member from the roof structure.

10. The combination recited in claim 8 wherein the roof structure includes side rail structures providing the side edge portions thereof, and rear quarter structures located adjacent each side of the seat, the interconnecting means including freely rotatable pulleys mounted on one of such structures and one-way pulley means mounted on the other of such structures.

11. In a vehicle body including a seat for supporting an occupant in seated attitude, a roof structure overlying the seat, the combination comprising, an elongated inflatable member of generally rectangular shape and of a width generally spanning the roof structure transversely of the body, the member being normally located in a folded condition adjacent the roof structure, an elongated pressure vessel spanning the roof structure transversely of the body and providing a source of pressure fluid, an elongated pressure fluid diffuser communicating with the pressure vessel and spanning the roof structure transversely thereof, means securing the upper edge portion of the member to the diffuser for projection therefrom with respect to the seat upon inflation and unfolding of the member, means for selectively communicating the diffuser with the pressure vessel, and means interconnecting the side edge portions of the inflatable member and the body and operated by inflation and projection of the member downwardly and rearwardly from the diffuser to locate the member in a predetermined position with respect to the seat to provide a barrier engageable by the torso of a seated occupant, the lower edge portion of the member being located in a position to engage the pelvic area of a seated occupant and exert a rearward and downward restraining force thereon with respect to the body.

12. The combination recited in claim 11 wherein the roof structure includes side rail structures providing the side edge portions thereof, the pressure vessel and diffuser extending between such side rail structures and communicating with each other at one end thereof, the means locating the inflatable member including at least one freely rotatable pulley member and at least one one-way rotatable pulley member located to each side of the inflatable member and an endless cable extending around each pair of pulley members and secured at one point to the inflatable member, at least one pulley member of each pair being mounted on the roof rail structure and the other pulley member being mounted on the body adjacent the seat.

13. A vehicle safety assembly comprising: an inflatable means having a collapsed position and an extended position for limiting movement of an occupant, said inflatable means being elongated in the extended position, guide means attached to an extending end portion of said inflatable means for movement therewith as said inflatable means toward the extended position, and control means adapted for attachment to support structure and coacting with said guide means for allowing movement of said guide means and said inflatable means toward said extended position while preventing movement thereof toward said collapsed position.

\* \* \* \* \*

PO-1050
(5/69)

UNITED STATES PATENT OFFICE
CERTIFICATE OF CORRECTION

Patent No. __3,774,936__                   Dated __November 27, 1973__

Inventor(s) __Ronald R. Barnett and George Drach, Jr.__

It is certified that error appears in the above-identified patent and that said Letters Patent are hereby corrected as shown below:

Column 4, line 13, "weld nut 103" should read
-- weld nut 104 --.

Column 5, line 32, "the" (second occurrence) should read
-- to --.

Column 6, line 15, "operative upon" should read
-- operated by --.
         line 16, after "member" insert -- downwardly and rearwardly --.

Column 7, line 12, "rotatable" (both occurrences) should be deleted.

Column 8, line 32, after "one-way" delete -- rotatable --.
         line 45, after "means" and before "toward" insert -- moves --.

Signed and sealed this 4th day of June 1974.

(SEAL)
Attest:

EDWARD M. FLETCHER, JR.
Attesting Officer

C. MARSHALL DANN
Commissioner of Patents